(12) United States Patent
Woodworth, Jr.

(10) Patent No.: US 11,487,868 B2
(45) Date of Patent: *Nov. 1, 2022

(54) SYSTEM, METHOD, AND APPARATUS FOR COMPUTER SECURITY

(71) Applicant: PC Matic, Inc, Sioux City, IA (US)

(72) Inventor: Robert J. Woodworth, Jr., Charleston, SC (US)

(73) Assignee: PC MATIC, INC., Sioux City, IA (US)

( * ) Notice: Subject to any disclaimer, the term of this patent is extended or adjusted under 35 U.S.C. 154(b) by 125 days.

This patent is subject to a terminal disclaimer.

(21) Appl. No.: 17/069,979

(22) Filed: Oct. 14, 2020

(65) Prior Publication Data

US 2021/0026951 A1 Jan. 28, 2021

Related U.S. Application Data

(63) Continuation-in-part of application No. 15/666,212, filed on Aug. 1, 2017, now Pat. No. 10,873,588.

(51) Int. Cl.
*G06F 21/54* (2013.01)
*G06F 21/53* (2013.01)
(Continued)

(52) U.S. Cl.
CPC .............. *G06F 21/54* (2013.01); *G06F 21/51* (2013.01); *G06F 21/53* (2013.01); *G06F 21/554* (2013.01); *G06F 21/561* (2013.01); *H04L 63/145* (2013.01); *H04L 63/1416* (2013.01); *H04L 63/101* (2013.01); *H04L 67/1097* (2013.01)

(58) Field of Classification Search
None
See application file for complete search history.

(56) References Cited

U.S. PATENT DOCUMENTS 7,890,338 B2 * 2/2011 Loder .................... G06Q 10/10
379/100.09
8,042,161 B1 * 10/2011 Cooley ................... H04L 51/48
713/168
(Continued)

FOREIGN PATENT DOCUMENTS

CN 103180862 A 6/2013
CN 103839000 6/2014
(Continued)

OTHER PUBLICATIONS

Google Translation of CN103180862B (Year: 2016).*
(Continued)

*Primary Examiner* — Luu T Pham
*Assistant Examiner* — James J Wilcox
(74) *Attorney, Agent, or Firm* — D2 Worldwide LLC; Frank Liebenow

(57) ABSTRACT

A super-shield system for protecting a computer from malicious software uses a whitelist to determine if a program is safe to run. As new malicious software is created, inadvertent attempts at execution of executables including such malicious software is prevented being that the new malicious software are not listed in the whitelist. When attempts are made to run unknown software, the executable is forwarded to a server where further analysis is performed to determine if the executable contains suspect code (e.g., malicious software).

11 Claims, 11 Drawing Sheets

(51) Int. Cl.
G06F 21/56 (2013.01)
G06F 21/55 (2013.01)
G06F 21/51 (2013.01)
H04L 9/40 (2022.01)
H04L 67/1097 (2022.01)

(56) References Cited

U.S. PATENT DOCUMENTS

| | | | | |
|---|---|---|---|---|
| 8,135,022 B2* | 3/2012 | Sterman | H04L 65/1101 | 370/401 |
| 8,527,978 B1* | 9/2013 | Sallam | G06F 8/65 | 717/169 |
| 8,713,668 B2* | 4/2014 | Cooper | H04L 63/0442 | 726/13 |
| 8,793,806 B1* | 7/2014 | Truong | H04L 63/101 | 713/182 |
| 8,800,024 B2* | 8/2014 | Cooper | H04L 63/10 | 726/13 |
| 8,863,284 B1* | 10/2014 | Polyakov | H04L 63/145 | 726/22 |
| 8,925,101 B2* | 12/2014 | Bhargava | G06F 21/53 | 713/188 |
| 9,058,504 B1* | 6/2015 | Swanson | G06F 21/566 | |
| 9,137,247 B2* | 9/2015 | Smith | H04L 63/0861 | |
| 9,189,629 B1* | 11/2015 | Nachenburg | G06F 21/565 | |
| 9,389,993 B1* | 7/2016 | Okmyanskiy | G06F 12/00 | |
| 9,467,435 B1* | 10/2016 | Tyler | H04L 51/212 | |
| 10,193,890 B2* | 1/2019 | Uchizumi | H04L 63/101 | |
| 10,305,929 B2 | 5/2019 | Kulkarni | | |
| 10,958,679 B2* | 3/2021 | Kirti | H04L 63/1416 | |
| 2003/0115479 A1* | 6/2003 | Edwards | G06F 21/564 | 726/22 |
| 2005/0080855 A1* | 4/2005 | Murray | H04L 51/212 | 709/206 |
| 2007/0005717 A1* | 1/2007 | LeVasseur | H04L 9/3263 | 709/206 |
| 2007/0028110 A1* | 2/2007 | Brennan | H04L 63/18 | 713/176 |
| 2007/0028291 A1* | 2/2007 | Brennan | H04L 63/145 | 713/1 |
| 2007/0028302 A1* | 2/2007 | Brennan | G06F 21/55 | 726/24 |
| 2007/0028303 A1* | 2/2007 | Brennan | G06F 21/55 | 726/24 |
| 2007/0028304 A1* | 2/2007 | Brennan | G06F 21/55 | 726/24 |
| 2007/0180509 A1* | 8/2007 | Swartz | G06F 9/4406 | 726/9 |
| 2008/0104186 A1* | 5/2008 | Wieneke | H04L 51/212 | 709/206 |
| 2008/0168558 A1* | 7/2008 | Kratzer | H04L 63/1408 | 726/23 |
| 2009/0070752 A1* | 3/2009 | Alpern | G06F 8/63 | 717/148 |
| 2009/0083852 A1* | 3/2009 | Kuo | G06F 21/564 | 726/22 |
| 2009/0119106 A1* | 5/2009 | Rajakumar | G06F 21/32 | 704/E17.001 |
| 2009/0132813 A1* | 5/2009 | Schibuk | G06Q 20/4014 | 726/9 |
| 2009/0180777 A1* | 7/2009 | Bernard | H04L 41/509 | 398/68 |
| 2009/0282469 A1* | 11/2009 | Lynch | H04B 7/18506 | 370/328 |
| 2010/0017360 A1* | 1/2010 | Bansal | H04L 51/48 | 707/E17.044 |
| 2010/0112981 A1* | 5/2010 | Suh | H04W 48/14 | 455/411 |
| 2011/0029772 A1* | 2/2011 | Fanton | G06F 21/53 | 713/165 |
| 2011/0047594 A1* | 2/2011 | Mahaffey | G06F 21/564 | 726/1 |
| 2011/0047597 A1* | 2/2011 | Mahaffey | H04L 67/60 | 709/219 |
| 2011/0047620 A1* | 2/2011 | Mahaffey | H04L 63/20 | 726/22 |
| 2011/0087882 A1* | 4/2011 | Kuo | H04L 63/0823 | 713/156 |
| 2011/0113109 A1* | 5/2011 | LeVasseur | H04L 51/212 | 709/206 |
| 2011/0145920 A1* | 6/2011 | Mahaffey | H04W 12/12 | 726/22 |
| 2011/0185417 A1 | 7/2011 | Zhou et al. | | |
| 2011/0258454 A1* | 10/2011 | Qiu | H04L 63/10 | 713/176 |
| 2012/0089839 A1* | 4/2012 | Qiu | H04L 9/0891 | 713/168 |
| 2012/0110174 A1* | 5/2012 | Wootton | H04L 63/1416 | 709/224 |
| 2012/0198017 A1* | 8/2012 | LeVasseur | H04L 63/0428 | 709/206 |
| 2012/0226761 A1* | 9/2012 | Emigh | H04L 51/212 | 709/206 |
| 2012/0240236 A1* | 9/2012 | Wyatt | G06F 21/562 | 726/25 |
| 2012/0266247 A1* | 10/2012 | Guy | G06F 11/3604 | 726/25 |
| 2012/0310983 A1* | 12/2012 | Mittal | G06F 21/6209 | 707/E17.005 |
| 2012/0311322 A1* | 12/2012 | Koyun | G06Q 20/3674 | 713/155 |
| 2012/0311659 A1* | 12/2012 | Narain | H04W 12/37 | 726/1 |
| 2013/0074186 A1* | 3/2013 | Muttik | G06F 21/57 | 726/24 |
| 2013/0096943 A1* | 4/2013 | Carey | G06F 21/6263 | 705/2 |
| 2013/0097659 A1* | 4/2013 | Das | G06F 21/51 | 726/1 |
| 2013/0097708 A1* | 4/2013 | Jayanthi | H04L 63/145 | 726/25 |
| 2013/0117400 A1* | 5/2013 | An | H04L 51/04 | 709/206 |
| 2013/0177238 A1* | 7/2013 | Yoshio | G06V 40/172 | 382/160 |
| 2013/0185797 A1* | 7/2013 | Zhou | G06F 21/52 | 726/23 |
| 2013/0232061 A1* | 9/2013 | Gueron | G06Q 20/023 | 705/39 |
| 2013/0276056 A1* | 10/2013 | Epstein | G06F 9/45558 | 726/1 |
| 2013/0291086 A1* | 10/2013 | Pontillo | H04L 63/0823 | 726/10 |
| 2014/0019601 A1* | 1/2014 | Blacka | G06F 16/9566 | 709/223 |
| 2014/0075520 A1* | 3/2014 | Subramanian | H04L 63/101 | 726/4 |
| 2014/0075567 A1* | 3/2014 | Raleigh | H04L 12/14 | 726/26 |
| 2014/0215634 A1* | 7/2014 | Ho | G06F 21/10 | 726/26 |
| 2014/0229557 A1* | 8/2014 | Dietz | H04L 51/212 | 709/206 |
| 2014/0237599 A1* | 8/2014 | Gertner | H04L 63/1425 | 726/24 |
| 2014/0282978 A1* | 9/2014 | Lerner | H04L 63/083 | 726/7 |
| 2014/0283109 A1* | 9/2014 | Quong | G06F 21/51 | 726/27 |
| 2014/0283110 A1* | 9/2014 | Quong | G06F 21/60 | 726/27 |
| 2014/0298460 A1* | 10/2014 | Xue | H04L 63/1483 | 726/23 |
| 2015/0026341 A1* | 1/2015 | Blacka | G06F 16/9566 | 709/225 |
| 2015/0067764 A1* | 3/2015 | Kim | H04L 63/101 | 726/1 |

(56) References Cited

U.S. PATENT DOCUMENTS

| | | | |
|---|---|---|---|
| 2015/0067813 A1* | 3/2015 | Cha | H04L 63/0807 726/10 |
| 2015/0111534 A1* | 4/2015 | Grayson | H04W 12/06 455/414.3 |
| 2015/0332043 A1 | 11/2015 | Russello | |
| 2016/0034589 A1* | 2/2016 | Liu | G06F 16/9535 707/706 |
| 2016/0092697 A1* | 3/2016 | Nayshtut | H04L 63/0414 726/26 |
| 2016/0099963 A1* | 4/2016 | Mahaffey | G06F 21/554 726/25 |
| 2016/0182531 A1* | 6/2016 | Rubakha | G06F 21/57 726/1 |
| 2016/0188350 A1* | 6/2016 | Shah | G09C 1/00 717/148 |
| 2016/0188873 A1* | 6/2016 | Smith | G06F 21/53 726/22 |
| 2016/0269247 A1* | 9/2016 | Chakradhar | H04L 67/12 |
| 2016/0321452 A1* | 11/2016 | Richardson | H04W 12/37 |
| 2016/0337364 A1* | 11/2016 | Grankovskyi | G06Q 10/00 |
| 2016/0373433 A1* | 12/2016 | Rivers | H04L 9/3265 |
| 2017/0006049 A1* | 1/2017 | Muttik | H04L 63/1425 726/23 |
| 2017/0063811 A1 | 3/2017 | Hitchcock et al. | |
| 2017/0078321 A1* | 3/2017 | Maylor | H04L 63/08 |
| 2017/0093918 A1* | 3/2017 | Banerjee | H04L 41/0895 |
| 2017/0118167 A1* | 4/2017 | Subramanya | H04L 63/101 |
| 2017/0118228 A1 | 4/2017 | CP et al. | |
| 2017/0141926 A1* | 5/2017 | Xu | H04L 9/3066 |
| 2017/0180378 A1* | 6/2017 | Tyler | H04L 63/1433 |
| 2017/0195286 A1* | 7/2017 | Stahura | H04L 61/4511 |
| 2017/0195310 A1* | 7/2017 | Tyler | H04L 63/083 |
| 2017/0206034 A1* | 7/2017 | Fetik | G06F 3/0604 |
| 2017/0223012 A1* | 8/2017 | Xu | H04L 63/0815 |
| 2017/0295180 A1* | 10/2017 | Day | H04L 63/10 |
| 2017/0310692 A1* | 10/2017 | Ackerman | H04L 63/1458 |
| 2017/0310693 A1* | 10/2017 | Howard | H04L 63/166 |
| 2017/0310703 A1* | 10/2017 | Ackerman | H04L 63/1425 |
| 2017/0324545 A1* | 11/2017 | Brandenburger | H04L 63/0823 |
| 2017/0351706 A1* | 12/2017 | Kong | G06F 16/9535 |
| 2017/0357712 A1* | 12/2017 | Zhu | G06F 16/328 |
| 2017/0359306 A1* | 12/2017 | Thomas | H04L 63/145 |
| 2018/0097843 A1* | 4/2018 | Bursell | H04L 63/1408 |
| 2018/0115551 A1* | 4/2018 | Cole | H04L 63/083 |
| 2018/0167402 A1* | 6/2018 | Scheidler | G06N 20/00 |
| 2018/0183586 A1* | 6/2018 | Bhargav-Spantzel | G06F 21/32 |
| 2018/0198806 A1 | 7/2018 | Gopalakrishna | |
| 2018/0316694 A1 | 11/2018 | Thakar et al. | |
| 2018/0359244 A1* | 12/2018 | Cockerill | H04L 63/0823 |
| 2019/0007436 A1 | 1/2019 | Dods | |
| 2019/0036930 A1* | 1/2019 | Bartik | G06F 21/577 |
| 2020/0021671 A1* | 1/2020 | Leung | H04L 63/10 |
| 2021/0112062 A1* | 4/2021 | Shimizu | H04L 63/101 |

FOREIGN PATENT DOCUMENTS

| | | | | |
|---|---|---|---|---|
| CN | 103180862 B | * | 3/2016 | G06F 11/3013 |
| GB | 2554390 | | 4/2018 | |

OTHER PUBLICATIONS

Pareek et al "Application Whitelisting: Approaches and Challenges," International Journal of Computer Science, Engineering and Information Technology (IJCSEIT), vol. 2, No. 5, Oct. 2012, pp. 13-18 (Year: 2012).*

Dery "Using Whitelisting to Combat Malware Attacks at Fannie Mae," 2013, IEEE Computer and Reliability Societies, pp. 90-92 (Year: 2013).*

Hizver et al "Cloud-Based Application Whitelisting," 2013 IEEE Sixth International Conference on Cloud Computing, IEEE Computer Society, pp. 636-643 (Year: 2013).*

Chawathe et al "Effective Whitelisting for Filesystem Forensics," 2009, IEEE, pp. 131-136 (Year: 2009).*

* cited by examiner

SYSTEM, METHOD, AND APPARATUS FOR COMPUTER SECURITY

CROSS-REFERENCE TO RELATED APPLICATION

This application is a continuation-in-part of to U.S. patent application Ser. No. 15/666,212, filed Aug. 1, 2017, the disclosure of which is hereby incorporated by reference.

FIELD

This invention relates to computer security and more particularly to a super-shield system for providing enhanced security through the use of white lists.

BACKGROUND

Currently, many software systems attempt to provide a secure computing environment. Such systems are typically referred to as firewalls, anti-malware software, etc. Any computer (including cellular phones) that is connected to a network is subject to intrusion via that network.

One form of intrusion is possible when the target computer is poorly administered, leaving it accessible from other computers on the network. This is typically a firewall and/or permissions issue.

Another form of intrusion is possible by logging into the computer from another computer on a network. This type of intrusion typically requires knowledge of a username and password. Intrusion is usually accomplished when the user creates an easily discoverable password (e.g. the user's last name followed by a '1') or when the user does not safeguard the password. An example of such lack of safeguarding the password is by writing the password on a sticky note that is adhered to the computer or by entering the password in a public place where another might see the password or the keystrokes being typed.

Today, many intrusions start with reception of malicious software. Malicious software is typically a software program that is installed on the user's computer sometime without permission or knowledge of the user. In some instances, the malicious software is delivered to the user in an email, typically an attached file. Upon opening of the file, the malicious software is copied onto the user's computer storage and begins to run. Many malicious software programs start out by sending duplicate copies of the malicious software to everybody on the user's email list, also known as a "worm". Unsuspecting friends of the user receive a message they think was sent by the user and, trusting the user, the friends open the message, thereby infecting the friend's computer with the malicious software.

Existing anti-malware software typically relies solely on a blacklist approach to reduce intrusion from malicious software. A blacklist is a record of all currently recognized malicious software. With anti-malware software that uses the blacklisting method, when an executable program tries to run, the blacklist anti-malware software scans the program, looking for signatures that match a signature in a blacklist. As new forms or versions of malicious software are deployed, typically, anti-malware users are subject to being infected by new/previously undetected malicious software until signatures are created for the new malicious software, the signatures are added to the blacklist, and the updated blacklist is distributed to users of the anti-malware software, through software updates or from the cloud.

Unfortunately, from the time a new malicious software is introduced to when it is detected, added to the blacklist, and distribute to each user's anti-malware software, there is a window of opportunity for intrusion by the new malicious software. If a user's anti-malware software blacklist is not updated with the new malicious software signature, the new malicious software can infect the user's computer when the user executes the new malicious software; for example by opening an attachment that contains the new malicious software. The anti-malware software will not recognize the attachment as malicious because the attachment is not presently in the black list. Therefore, the new malicious software will be allowed to execute.

The answer to this problem is a system that will protect from malicious software, both previously recognized, and brand new malicious software.

SUMMARY

A system for protecting a computer from malicious software is described. The system uses one or more whitelist of trusted programs in a super-shield to determine if a program is safe to run. As new software is introduced, downloaded and run (attempted) by users, execution is prevented until it is verified that the new software is absent of malware, as the new software is not listed in the whitelist of trusted programs.

In one embodiment, the system for protecting a computer includes providing a super-shield that includes two whitelists; one whitelist for signed executables, and a second whitelist for unsigned executables. Upon an attempt to initiate an executable on the computer, the system determines if the executable is signed, and if so, the first whitelist is scanned, to see if the executable is present. If present on the signed executables whitelist, the executable is allowed to run. If the executable is unsigned, the second whitelist is scanned to see if the executable is present. If the program is on the whitelist of unsigned executables, the executable is allowed to run.

If the executable is not found in the respective whitelist, the executable, metadata of the executable, or all or a portion of the executable is forwarded to a server (remote system), analyzed using heuristics, and a determination is made as to whether the executable contains malicious software or not (e.g., is malicious). If malicious software is found in the executable, notification regarding the malicious software is made. If malicious software doesn't exist in the executable, the respective whitelist is updated and the server communicates to the computer, that the executable is allowed to run. If it is determined that there may be malicious software in the executable, the executable is prevented from running, and queued for further research.

In another embodiment, a method of protecting a computer includes providing two whitelists; the first whitelist for signed executables, and the second whitelist for unsigned executables. Upon an attempt to initiate an executable on the computer, first, it is determined if the executable is signed. If the executable is signed, the first whitelist is scanned to see if the executable is present, and if so, the executable is allowed to run on the computer. If the executable is unsigned, the second whitelist is scanned to see if the executable is present, and if so, the executable is allowed to run on the computer.

If the executable is not found in the respective whitelist, the executable is forwarded to the server and analyzed at the server, using heuristics, to determine if malicious software exists in the executable. If it is determined that malicious software exists in the executable, execution is blocked and the user is notified that the executable contains malicious software. If the executable does not contain malicious software, the respective whitelist for signed/unsigned programs is updated, and the computer is notified that it is safe to run the executable. If it is determined that there may be malicious software in the executable, the executable is prevented from running, and queued for further research In another embodiment, program instructions tangibly embodied in a non-transitory storage medium, containing at least one instruction for providing security to a computer. At least one computer readable instruction running on the computer, determines when an executable attempts to initiate. Upon an attempt to initiate the executable on the computer, the computer readable instructions, running on the computer, determine if the executable is signed or unsigned. If the executable is signed, the computer readable instructions, running on the computer, search the whitelist of signed executables to see if the executable is present. If the executable is present on the first whitelist, the computer readable instructions, running on the computer, allow the executable to run. If the executable is unsigned, the computer readable instructions, running on the computer, search the whitelist of unsigned executables to see if the executable is present. If the executable is present on the second whitelist, of unsigned executables, the computer readable instructions, running on the computer, allow the executable to run. If the executable is found neither on the signed executables whitelist, nor the unsigned executables whitelist, the computer readable instructions, running on the computer, forward the executable to a server. Once the executable in question is on the server, the computer readable instructions, running on the server, analyze the executable, using heuristics, to determine if malicious software exists in the executable. If malicious software exists, the computer readable instructions, running on the server, notify the user (e.g. email a user) regarding the discovery of malicious software. If malicious software is not present in the executable, the computer readable instructions, running on the server, updates the respective whitelist for signed/unsigned executables, and the computer is notified that it is safe to run the executable. If the computer readable instructions running on the server determine that there may be malicious software in the executable, the executable is prevented from running, and queued for further research.

In another embodiment, a computer program product includes a non-transitory storage medium that has computer readable instructions stored therewith. The computer readable instructions being executable by a processor of a computer and include computer readable instructions running on the processor determining when an executable attempts to initiate on the processor. Upon determining that the executable attempts to initiate, the computer readable instructions running on the processor determining if the executable is signed. If the executable is signed, the computer readable instructions running on the computer searching a first whitelist to see if the executable is present and if the executable is present in the first whitelist, the computer readable instructions running on the processor allowing the executable to run. If the executable is unsigned, the computer readable instructions running on the processor searching the second whitelist to see if the executable is present on the second whitelist and if the executable is present on the second whitelist, the computer readable instructions running on the processor allowing the executable to run. If the executable is not found in either the first whitelist or the second whitelist, the computer readable instructions running on the processor preventing the executable from running and forwarding the executable to a server where computer readable instructions running on the server analyze the executable using heuristics to determine if a malware exists in the executable. If the malware exists in the executable, the computer readable instructions running on the server notifying regarding the malware by sending an email to a user of the computer;

if the malware doesn't exists in the executable, the computer readable instructions running on the server updating the respective whitelist of the two whitelists and communicating with the computer readable instructions running on the processor, the computer readable instructions running on the processor then allowing the executable to run. If the computer readable instructions running on the server determine that there may be malware in the executable, the computer readable instructions running on the server queuing the executable for further research.

BRIEF DESCRIPTION OF THE DRAWINGS

The invention can be best understood by those having ordinary skill in the art, by referencing the following detailed description when considering the accompanying drawings, in which.

DETAILED DESCRIPTION

Figure 1:
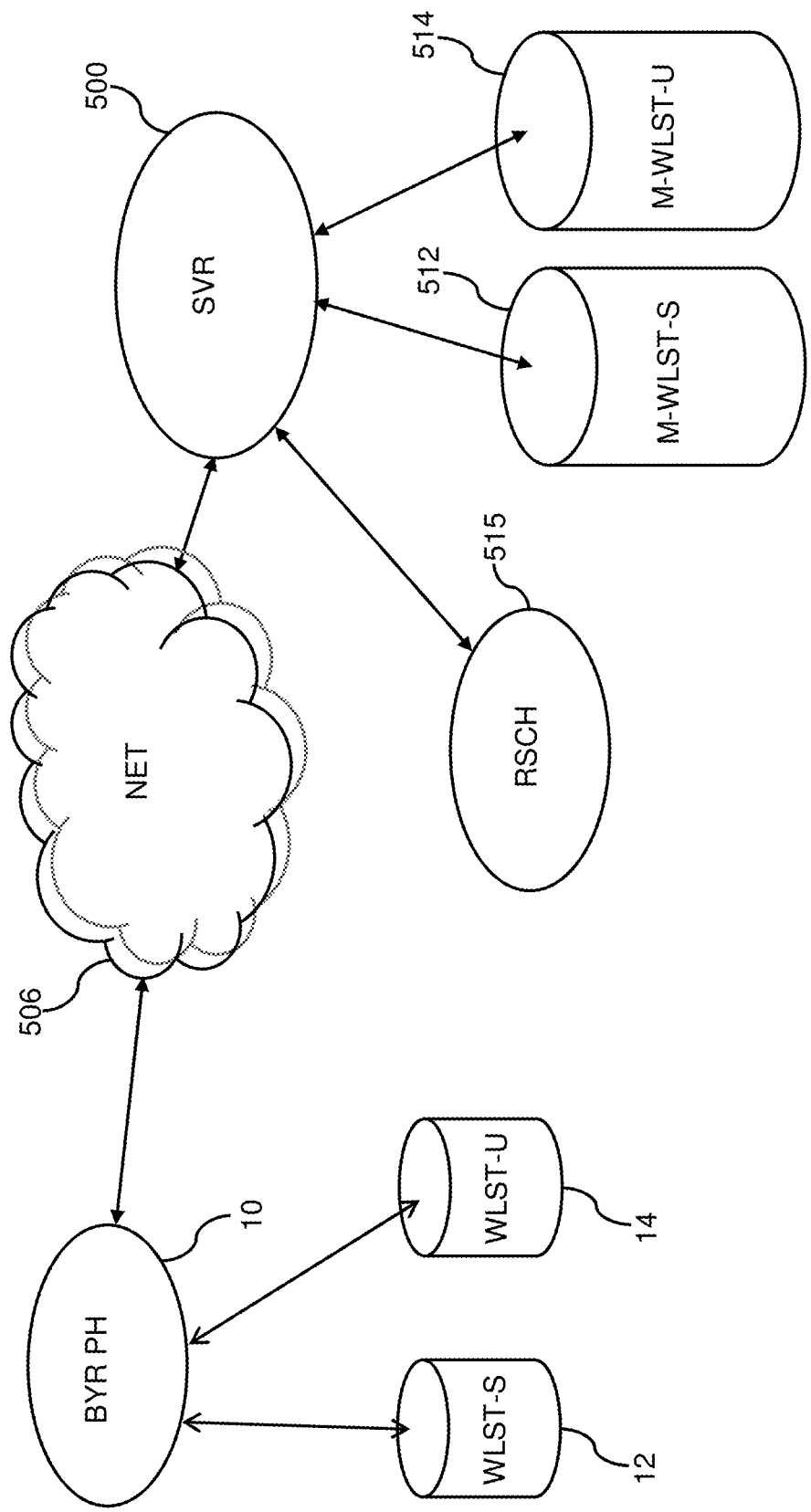
FIG. 1 illustrates a data connection diagram of the computer security system.

Reference will now be made in detail to the presently preferred embodiments of the invention, examples of which are illustrated in the accompanying drawings. Throughout the following detailed description, the same reference numerals refer to the same elements in all figures.

In general, the computer security system provides an automated way to prevent execution of software containing code that is contaminated (e.g. contains or is malicious software). Before execution of any code, a test is performed to assure that the code is safe. The test includes checking a super-shield that includes on or more whitelists to determine if the code has been previously tested for malicious software and if the code is on the whitelist, allowing execution of the code. Otherwise, the computer security system blocks execution.

Throughout this description, the term, "computer" refers to any system that has a processor and runs software. One example of such is a personal computer. The term, "user" refers to a human that has an interest in the computer, perhaps a user who is using the computer.

Throughout this description, the term, "malicious software" or "malware" refers to any software having ill-intent. Many forms of malicious software are known; some that destroy data on the host computer, some that capture information such as account numbers, passwords, etc., some that fish for information (phishing), pretending to be a known entity, to fool the user into providing information such as bank account numbers, some encrypt data on the computer and hold the data at ransom, etc. A computer virus is a form of malicious software.

In general, the user of the system, method, and apparatus being described utilizes efficient storage and retrieval mechanisms to determine if a program (e.g. an executable, macro, form, etc.) is identified within a list. A hash table is one such mechanism, though other mechanisms are equally anticipated and included here within. As an efficient way of characterizing the questionable program, in some embodiments, it is anticipated that rather than storing the entire program in such tables, a portion of the program is stored, often referred to as a signature of the program. The signature contains key sequences found within the program; finding of such key sequences typically indicates that the program matches the signature.

Referring to FIG. 1 illustrates a data connection diagram of the exemplary computer security system. In this example, a computer 10 (e.g., personal computer) communicates through a network 506 (e.g. the Internet, local area network, etc.) to a server computer 500.

The server computer 500 has access to data storage for maintaining the super-shield, including one or more whitelists; for example, a signed-whitelist 512 for signed applications and an unsigned-whitelist 514 for unsigned applications. In some embodiments, the storage is in the cloud. In some embodiments, the whitelists 512/514 are cached in storage of the computer 10 being protected.

Although one path between the computer 10 and the server 500 is shown going through the network 506 as shown, any known data path is anticipated. For example, the Wi-Fi transceiver 96 (see FIG. 2) of the computer 10 is used to communicate with the wide area network 506, which includes the Internet, and, consequently, with the server computer 500.

The server computer 500 transacts with software running on the computer 10 through the network(s) 506. The software monitors any activation of software (e.g. running of a program) and provides permission for running the software on the computer 10 when the software is deemed malicious software-free. Information is also transferred to the server regarding potential threats, etc.

The server computer 500 transacts with the portion of the computer security system that runs on the computer 10 as needed, for example, to update local whitelists 12/14.

The computer security system selectively provides execution approval to software that attempts to execute on the computer 10. In such, if approval is provided, the software is able to execute on the computer 10. If approval is not provided, the software is blocked from executing on the computer 10 and various additional steps are taken such as logging the attempt, transferring the suspect software to the server 500 for analysis, informing the user of the computer 10, etc.

Figure 2:
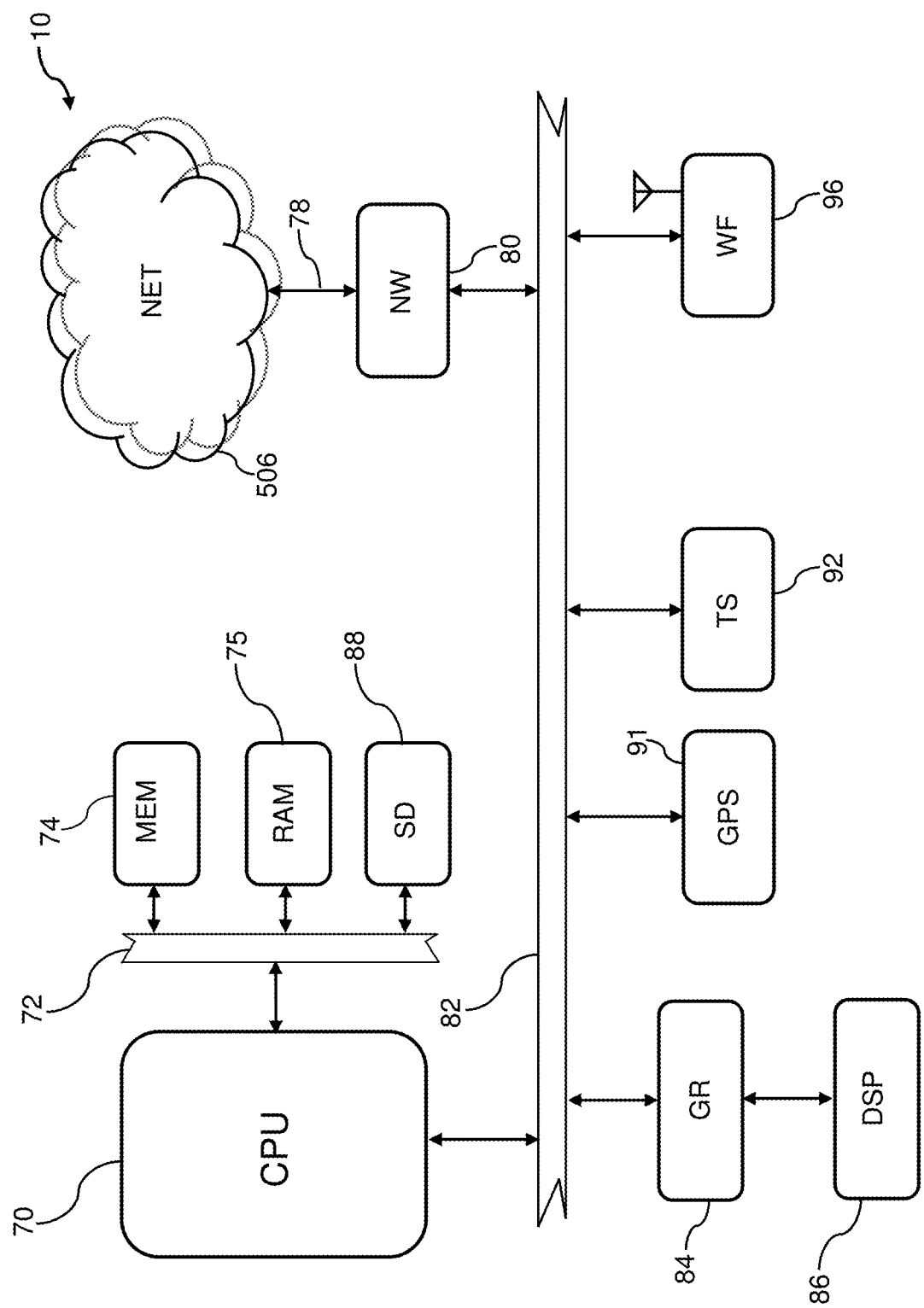
FIG. 2 illustrates a schematic view of a typical computer protected by the computer security system.

Referring to FIG. 2, a schematic view of a typical computer 10 is shown. A client-side of the computer security system runs on a processor-based device (e.g., computer 10) for providing protection against software that contains malicious software. The present invention is in no way limited to a computer 10, known as a personal computer. Many other processor-based devices are equally anticipated including, but not limited to smart phones, cellular phones, portable digital assistants, routers, thermostats, fitness devices, etc.

The example computer 10 represents a typical device used for accessing user interfaces of the computer security system. This exemplary computer 10 is shown in its simplest form. Different architectures are known that accomplish similar results in a similar fashion, and the present invention is not limited in any way to any particular computer 10 system architecture or implementation. In this exemplary computer 10, a processor 70 executes or runs programs in a random access memory 75. The programs are generally stored within a persistent memory 74 and loaded into the random access memory 75 when needed. In some computers 10, a removable storage slot 88 (e.g., compact flash, SD) offers removable persistent storage. The processor 70 is any processor, typically a processor designed for phones. The persistent memory 74, random access memory 75, and SIM card are connected to the processor by, for example, a memory bus 72. The random access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary computer 10, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the removable storage 88 is used to store programs, executable code, phone numbers, contacts, and data, etc. In some embodiments, other data is stored in the persistent memory 74 such as audio files, video files, text messages, etc.

The peripherals are examples, and other devices are known in the industry such as Global Positioning Subsystems, speakers, microphones, USB interfaces, cameras, microphones, Bluetooth transceivers, Wi-Fi transceivers 96, image sensors, temperature sensors, etc., the details of which are not shown for brevity and clarity reasons.

The network interface 80 connects the computer 10 to the network 506 through any known or future protocol such as Ethernet, Wi-Fi, GSM, TDMA, LTE, etc., through a wired or wireless medium 78. There is no limitation on the type of cellular connection used. The network interface 80 provides data and messaging connections between the computer 10 and the server through the network 506.

Figure 3:
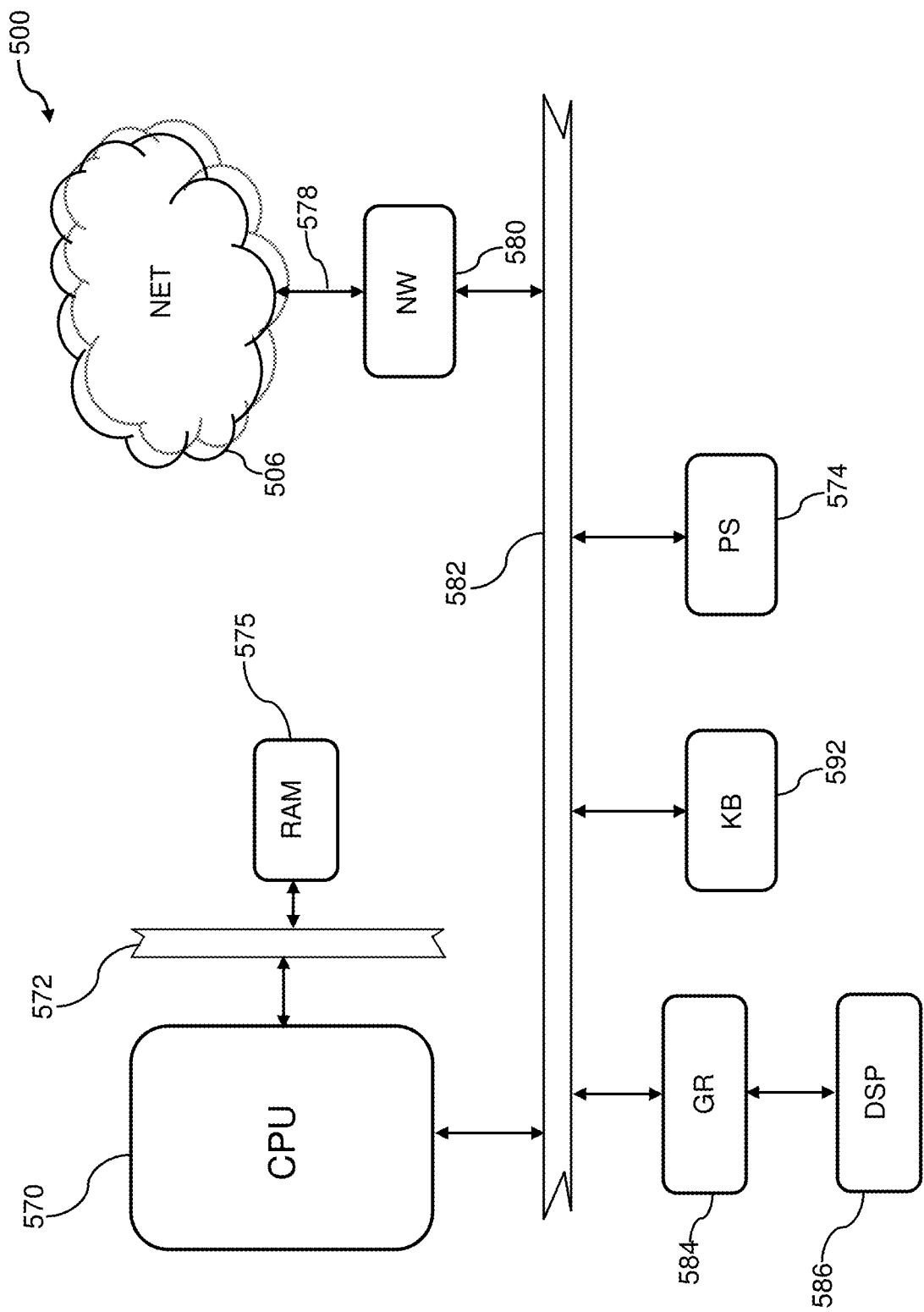
FIG. 3 illustrates a schematic view of a typical server computer system.

Referring to FIG. 3, a schematic view of a typical server computer system (e.g., server 500) is shown. The example server computer system 500 represents a typical server computer system used for back-end processing, generating reports, displaying data, etc. This exemplary server computer system 500 is shown in its simplest form. Different architectures are known that accomplish similar results in a similar fashion and the present invention is not limited in any way to any particular computer system architecture or implementation. In this exemplary computer system, a processor 570 executes or runs programs in a random access memory 575. The programs are generally stored within a persistent memory 574 and loaded into the random access memory 575 when needed. The processor 570 is any processor, typically a processor designed for computer systems with any number of core processing elements, etc. The random access memory 575 is connected to the processor by, for example, a memory bus 572. The random access memory 575 is any memory suitable for connection and operation with the selected processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent memory 574 is used to store programs, executable code, data, contacts, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Figure 4:
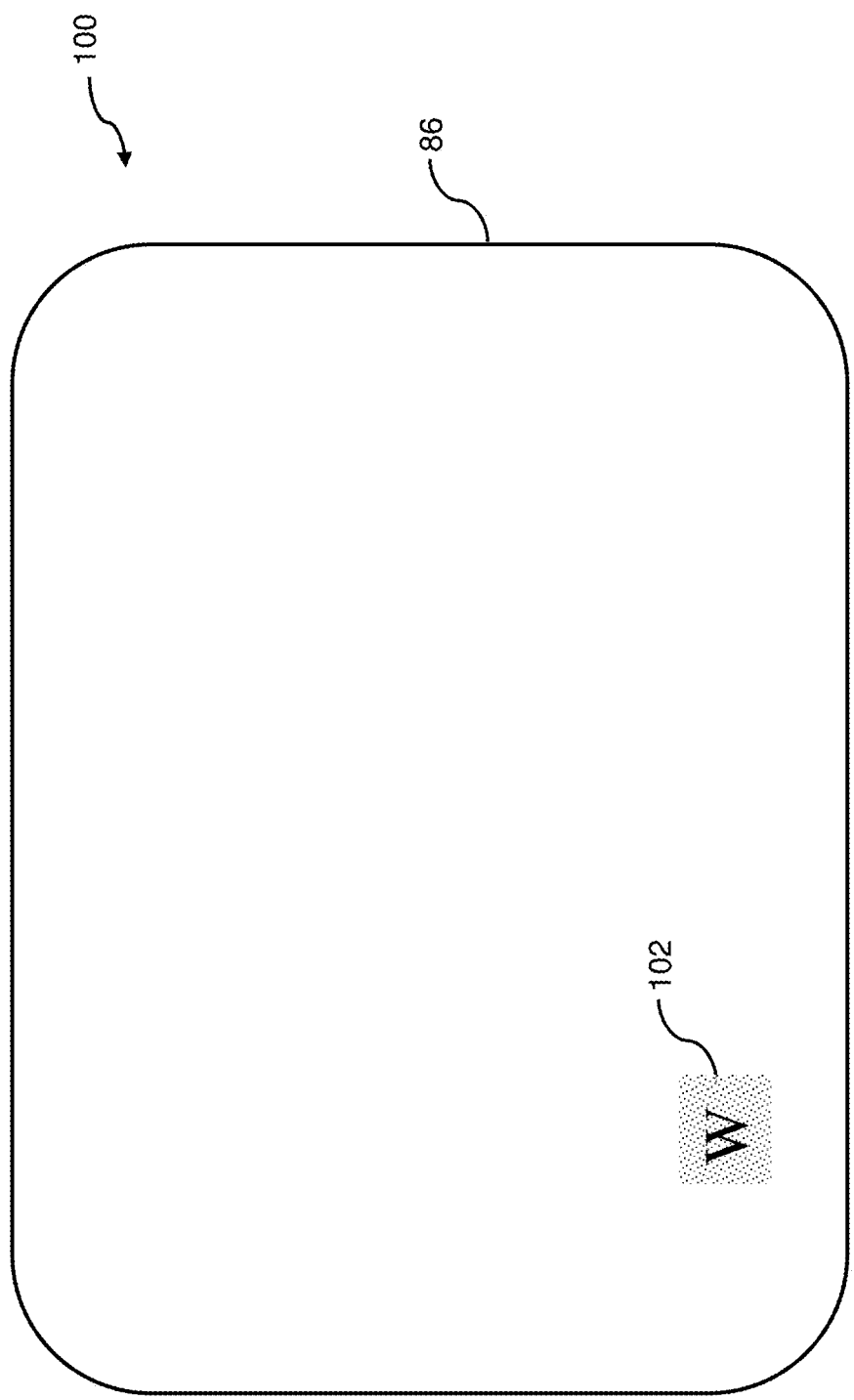
FIG. 4 illustrates a computer user interface of the computer security system.
Figure 5:
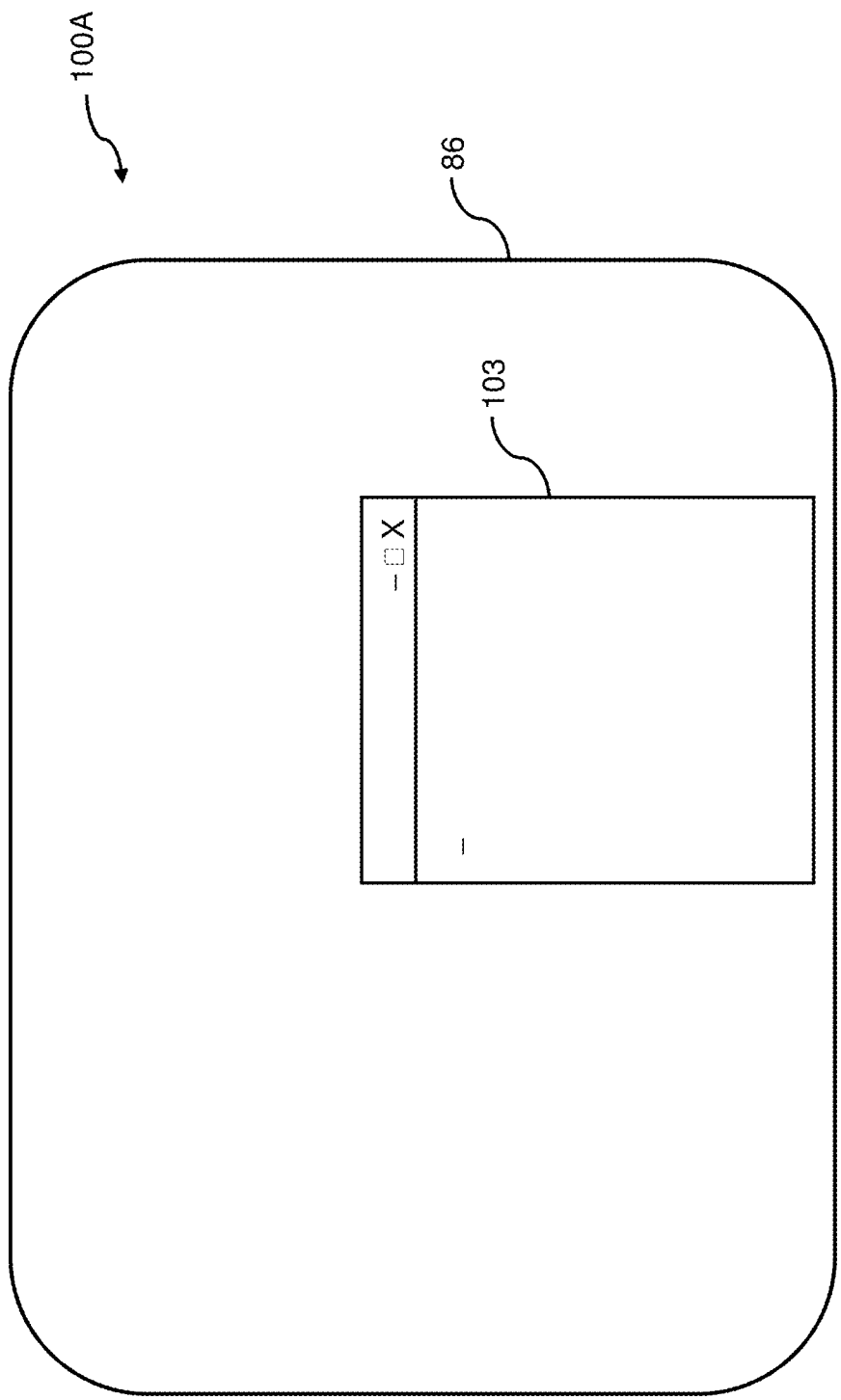
FIG. 5 illustrates a second computer user interface of the computer security system.
Figure 6:
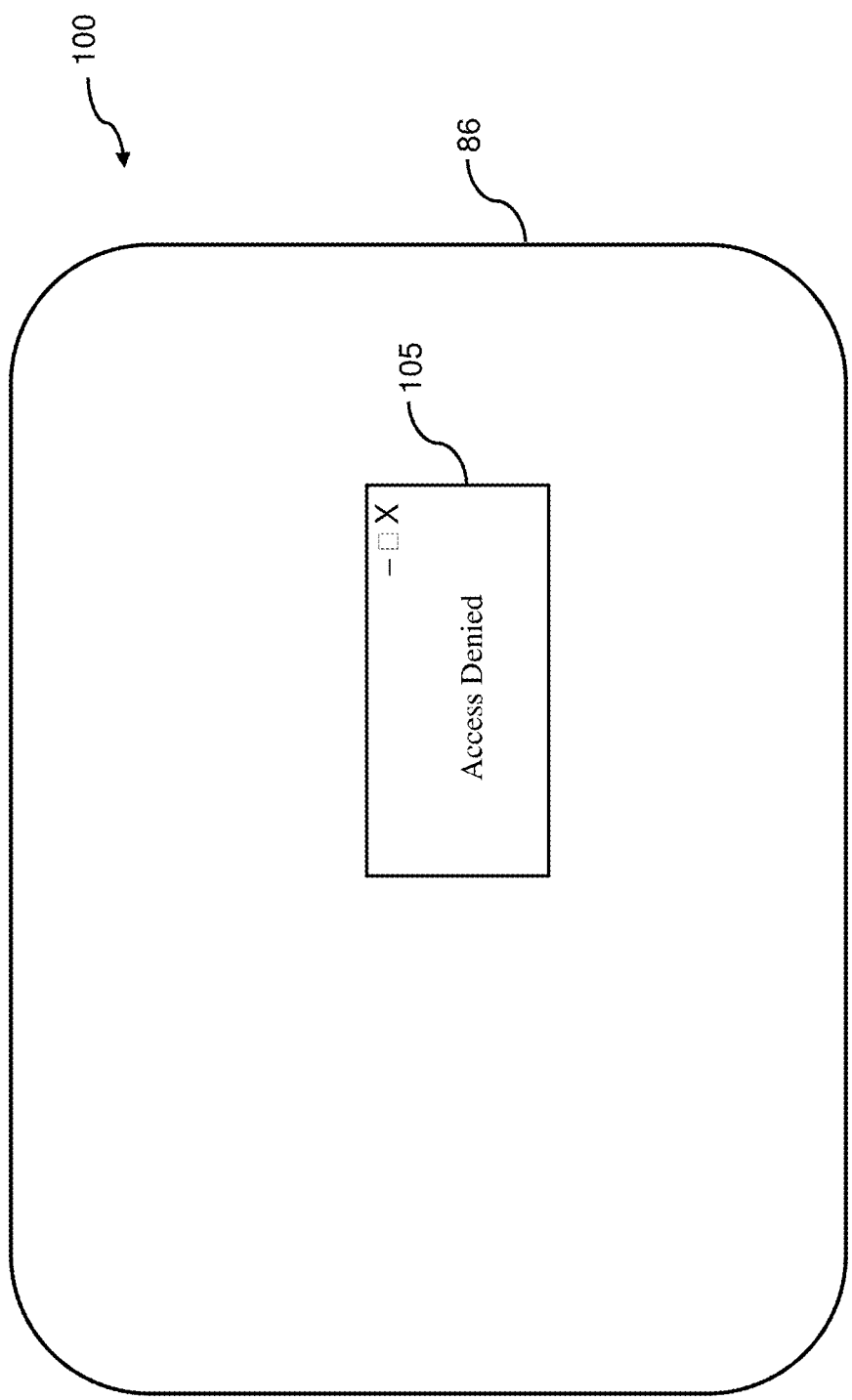
FIG. 6 illustrates a third computer user interface of the computer security system.

Referring to FIGS. 4-6, exemplary user interfaces 100, 100A, 100B of the computer security system are shown. Although many user interfaces are anticipated, one set of examples are shown for brevity reasons. The user interfaces 100, 100A, 100B that are shown represent that a program is stored on the computer 10 and is ready for execution. There are many ways for software to get loaded and executed on the computer 10, for example, through an email system, through a browser, through a forms interface, etc. The computer security system intercepts and processes all requests to initiate operation of any type of program.

One such example of a program ready to be run is shown in a user interface 100 of FIG. 4. A word processing program is represented as an icon 102 on a user's display 86. As with many windowing programs, a user typically selects the icon 102, usually double-clicking over the icon 102, and the program initiates.

After the user selects the icon 102 (e.g. double clicking), a program associated with the icon 102 attempts to run. The computer security system analyzes the program associated with the icon 102 using the super-shield and determines if it is known that this program is not malicious software, as will be described in the program flow of FIGS. 8-10.

If it is determined that the program is not malicious software, the program is allowed to execute as shown in a user interface 100A of FIG. 5, displaying a user interface window 103.

If it is determined that the program is potentially malicious software, the program is prevented from executing and a user interface 100B of FIG. 6 is presented, displaying an error message window 105.

Figure 7:
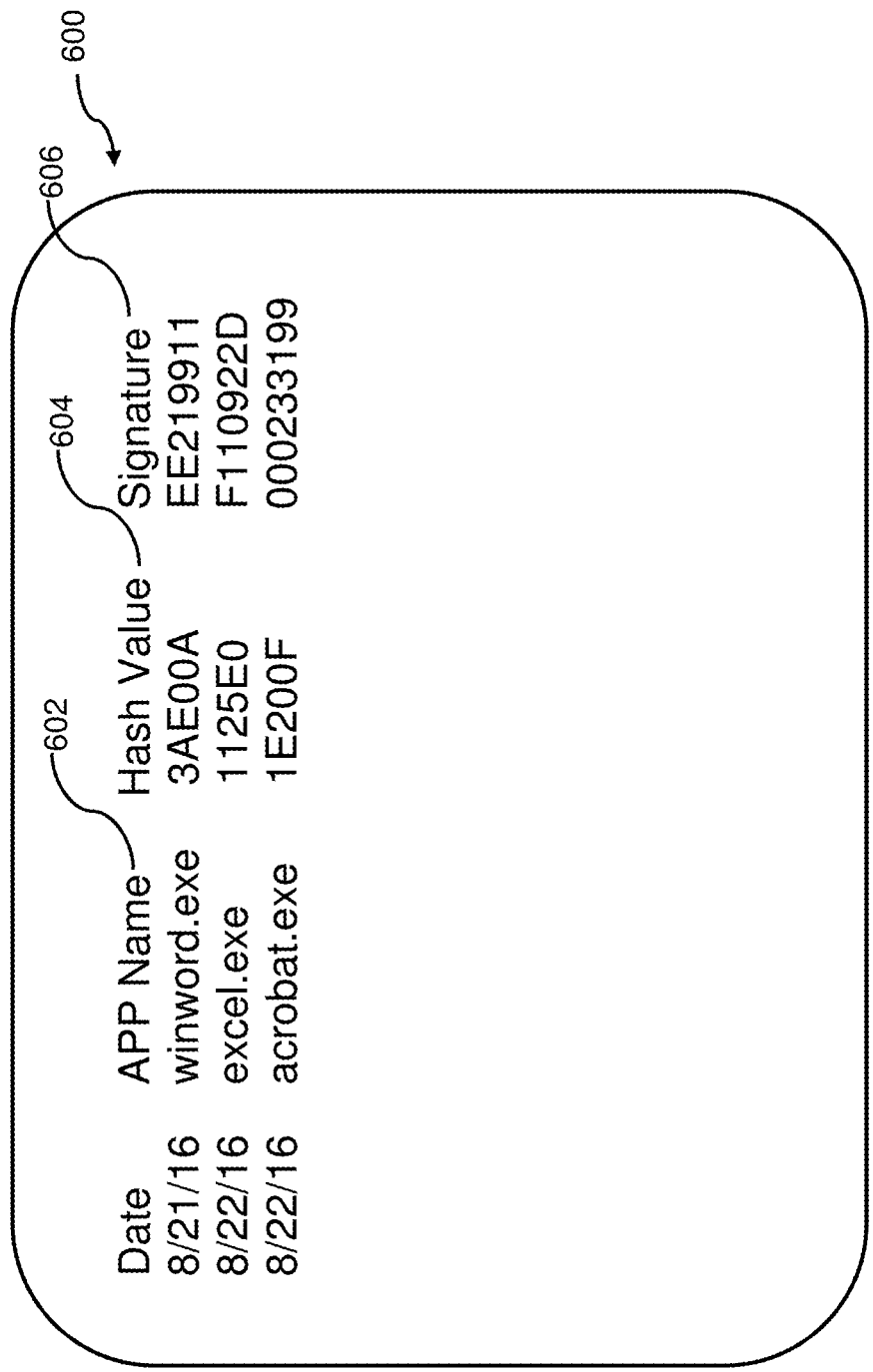
FIG. 7 illustrates an exemplary white list of the computer security system.

The table of FIG. 7 depicts one implementation of a whitelist table 600. As there are a huge number of known malicious software-free programs, it is anticipated that such a whitelist table 600 be implemented as a hash table. In that, the program name is used as a key to find an index value into the whitelist table 600 as understood in the field of programming.

Each entry of the whitelist table 600 includes information regarding the approved program such as the date of approval, the name of the program 602, a hash value 604 of the program, and a signature 606 of the program. In some embodiments, more or less information is maintained in the whitelist table 600.

In some embodiments, identification is by a hash value of the program is provided in the whitelist table 600. The hash value 604 of the program, for example is based upon a summation/modulus or other numerical calculation based upon the entire program or a portion of the program. Any tampering with the program by, for example, a hacker, will change the calculation, resulting in a mismatch between the calculated hash value and the hash value 604 from the whitelist table 600.

In some embodiments, identification is by a signature 606 of the program is provided in the whitelist table 600. The signature 606 of the program, for example is based upon a probing of the entire program or a portion of the program. For example, the presence or absence of certain strings within the program, values at certain locations within the program, etc. Any tampering with the program for example, by a hacker, will change a calculation of the signature, resulting in not finding certain expected values within the signature based upon the signature 606 from the whitelist table 600.

Figure 8:
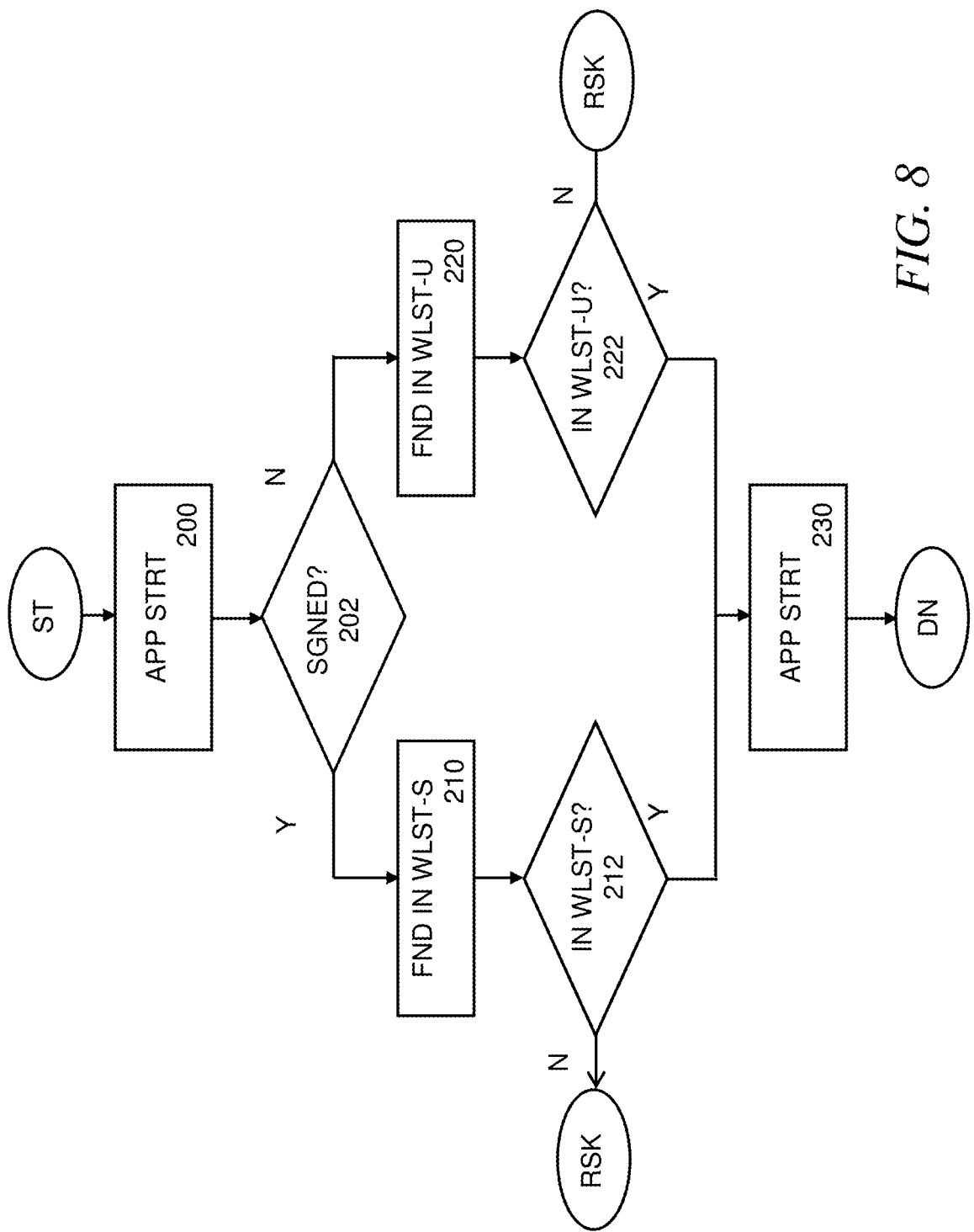
FIGS. 8-10 illustrate exemplary program flows of the computer security system.
Figure 9:
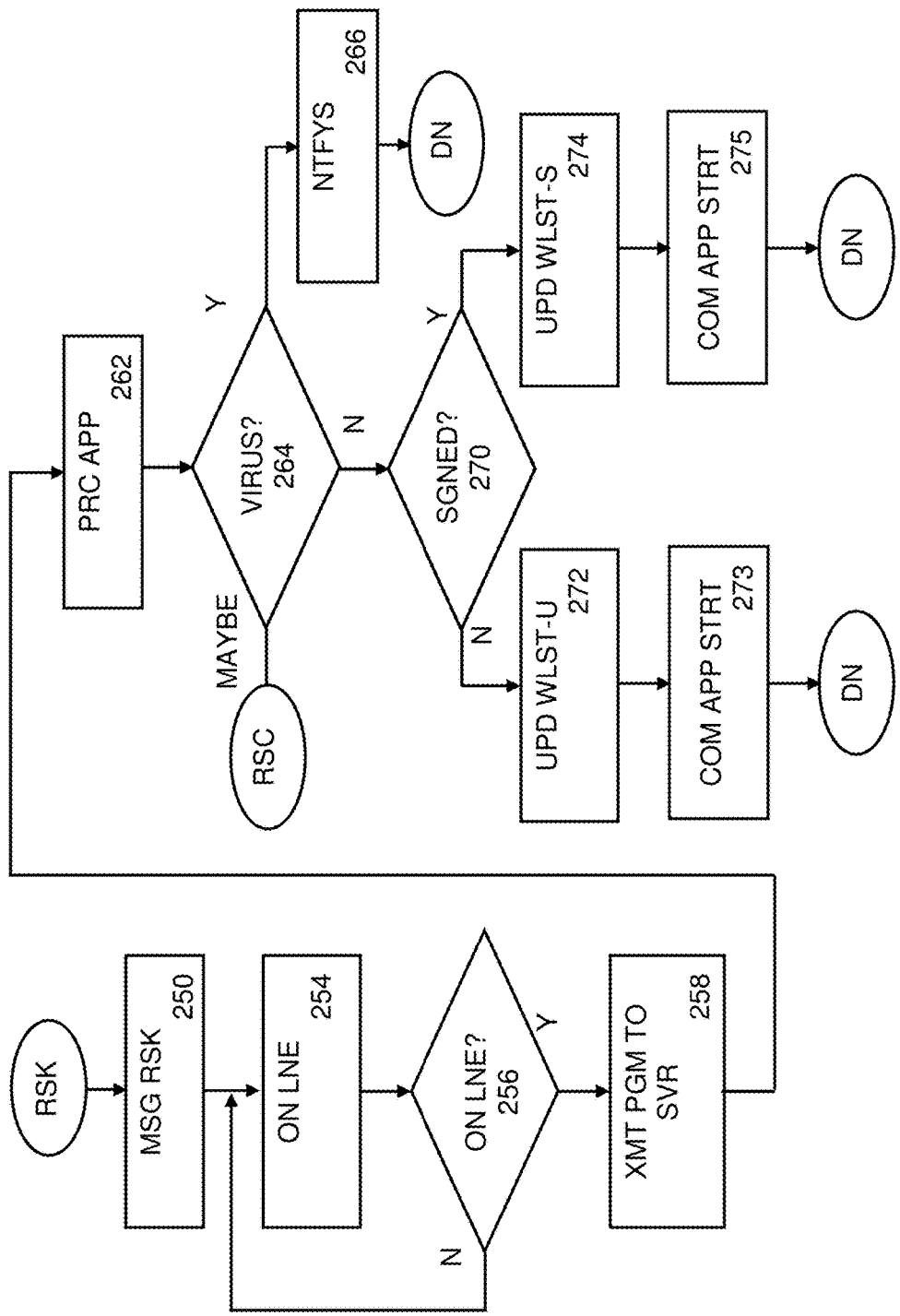
Figure 10:
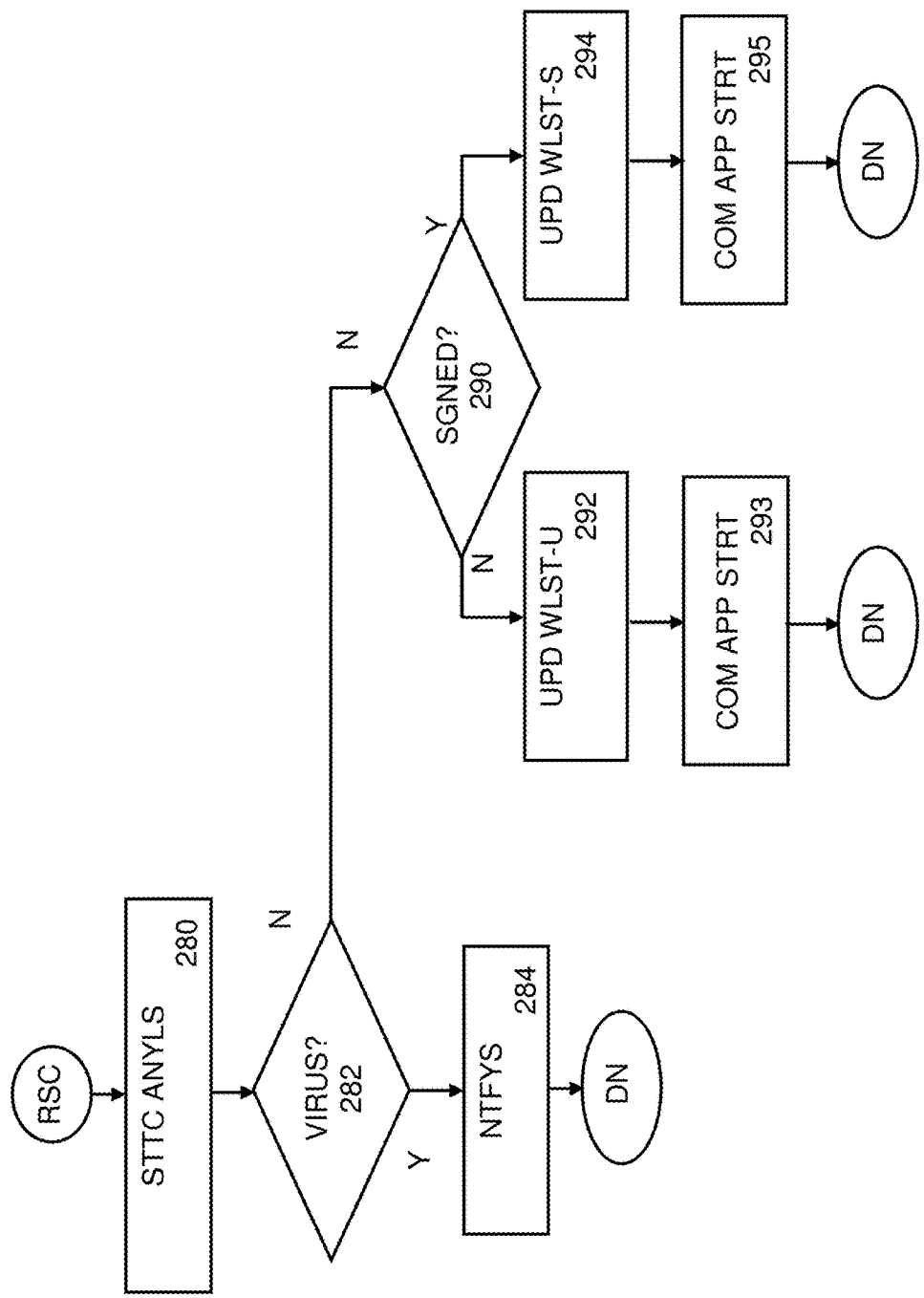

Referring to FIGS. 8-10, exemplary program flows of the system for providing access are shown.

It is anticipated that portions of the exemplary program flow execute on a user device such as a computer 10 while portions of the exemplary program flow execute on the server 500.

Although shown using two white lists, one for signed programs and one for unsigned programs, any number of whitelists is anticipated, including a single whitelist.

In this example, the flow starts by an executable attempting to start 200 on the computer. This step is anticipated to be performed through direct or indirect invocation by the user. In a direct invocation, the user knowingly executes an executable (e.g. software executable, application, etc.), for example, by double-clicking on a short-cut to that executable. In an indirect invocation, the user initiates execution of an executable by indirect ways such as browsing to a web site, opening an email attachment, etc.

The super-shield first determines 202 if the executable is signed. There are many ways to digitally sign a program. Signing includes a trusted identification, typically issued by a certification authority. It is believed that a signed executable is more trustworthy than an unsigned executable.

If it is determined 202 if the executable is signed, the signed-whitelist 12/512 is searched 210 to determine if the executable has been recorded in the signed-whitelist 12/512. If the searched determines 212 that the executable has been recorded in the signed-whitelist 12/512, the executable is trusted and that executable is started 230.

If it is determined 202 if the executable is unsigned, the unsigned-whitelist 14/514 is searched to determine 220 if the executable has been recorded in the unsigned-whitelist 14/514. If the searched determines 222 that the executable has been recorded in the unsigned-whitelist 14/514, the program is trusted and that executable is started 230.

If the executable was not found (e.g., the signed executable was not found in the signed-whitelist 12/512 or the unsigned executable was not found in the unsigned-whitelist 14/514, the computer 10 attempts communication with the server 500 for further analysis as per FIGS. 9 and 10.

In some embodiments, the super-shield of the computer 10 notifies 250 the user that some risk exists as it may take time to perform the analysis.

A determination 254 is made to see if the computer 10 is online (e.g. can connect to the server 500). If the computer 10 is not online 256, the determination 254 is repeated (e.g. periodically) until the computer 10 is online 256, at which time the program is transferred 258 to the server 500 for analysis.

When the executable is received by the server, the executable is processed 262 by the super-shield through a series of static and heuristic tests to determine if the executable is digitally signed, to determine what information is populated by the executable (e.g. folders created, registry entries, etc.), to determine the name of the executable, to determine the publisher of the executable, to determine what directory the executable tries to execute out of, etc.

If the processing 262 determines 264 that there is malicious software within the executable, the computer 10 and/or user is notified 266. For example, the user is sent an email providing details of the malicious software and perhaps instructions on how to remove the malicious software as well as how to prevent the same thing from infecting their computer 10 in the future, etc. In some embodiments, the user is directed to a training course to help them learn how to prevent malicious software from getting into the computer 10.

If the processing 262 determines 264 that there is not malicious software in the executable, then if the program is signed 270, the signed-whitelist 12/512 is updated 272 and the server communicates 273 with the computer 10 to allow running of the executable. If the processing 262 determines 264 that there is not malicious software, then if the executable is unsigned 270, the unsigned-whitelist 14/514 is updated 274 and the server communicates 275 with the computer 10 to allow running of the executable.

If the processing 262 determines 264 that there may be malicious software in the executable, further research and analysis is performed on the executable as shown in FIG. 12. Static analysis 280 is performed on the executable by installing the executable in a sand box (e.g. a clean computer that is isolated). The static analysis 280 includes scanning the executable with commercially available malicious software scan systems (e.g. 40 to 50 commercial malicious software scan engines). If the scan does not flag the executable as having malicious software, then the executable is further analyzed by a staff member to research behaviors of the executable and further determine if malicious software is present in the executable.

If the static analysis 280 determines 282 that there is not malicious software in the executable, then if the executable is unsigned 290, the unsigned-whitelist 14/514 is updated 292 and the server communicates 293 with the computer 10 to allow running of the program. If the static analysis 280 determines 282 that there is not malicious software, then if the executable is signed 290, the signed-whitelist 12/512 is updated 294 and the server communicates 295 with the computer 10 to allow running of the executable.

If the static analysis 280 determines 282 that there is malicious software in the executable, the computer 10 and/or user is notified 284. For example, the user is sent an email providing details of the malicious software and perhaps instructions on how to remove the malicious software as well as how to prevent the same thing from infecting their computer 10 in the future, etc. In some embodiments, the user is directed to a training course to help them learn how to prevent malicious software from getting into the computer 10.

Figure 11:
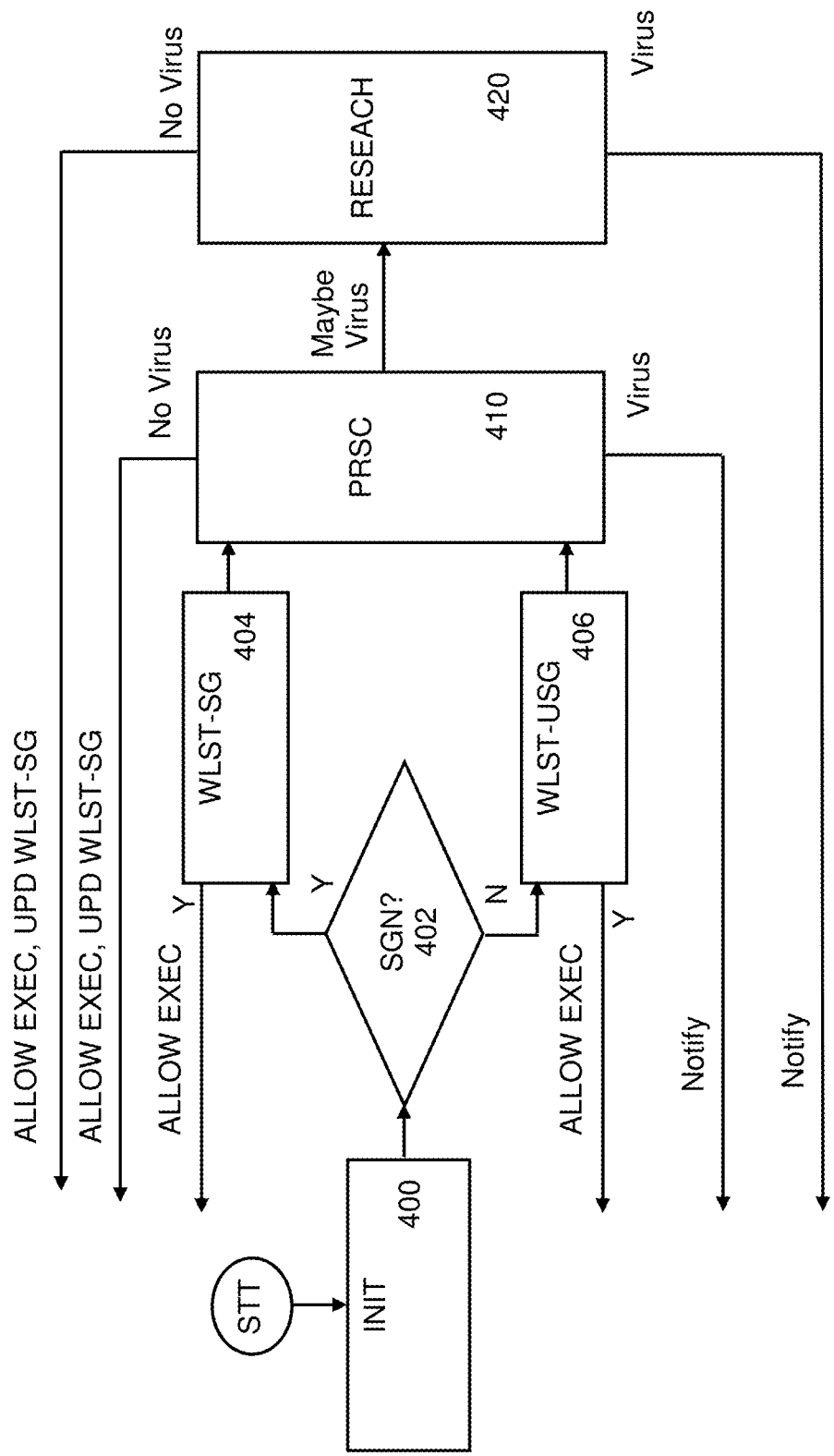
FIG. 11 illustrates an exemplary decision process of the computer security system.

In FIG. 11, a graphical representation of the computer security system is shown. An executable tries to initiate 400 on the computer 10. If the executable is signed, the signed-whitelist 12/512 is checked 404 and if there, the executable is allowed to execute. If the executable is unsigned, the unsigned-whitelist 14/514 is checked 406 and if there, the executable is allowed to execute.

If not in the respective whitelist 12/14/512/514, the executable is processed 410 using a series of static and heuristic tests to determine if the executable is digitally signed, to determine what information is populated by the executable (e.g. folders created, registry entries, etc.), the name of the executable, the publisher of the executable, what directory the executable tries to execute out of, etc. If the processing 410 determines that there is not malicious software, then the respective whitelist 12/14/512/514 is updated and the executable is allowed to run.

If the processing 410 of the super-shield determines that there is malicious software in the executable, the computer 10 and/or user is notified. For example, the user is sent an email providing details of the malicious software and perhaps instructions on how to remove the malicious software as well as how to prevent the same thing from infecting their computer 10 in the future, etc. In some embodiments, the user is directed to a training course to help them learn how to prevent malicious software from getting into the computer 10.

If the processing 410 determines that there may be malicious software in the executable, further research and analysis 420 is performed on the executable. Static analysis is performed on the executable by installing the program in a sand box (e.g. a clean computer that is isolated). The static analysis includes scanning the executable with commercially available malicious software scan systems (e.g. 40 to 50 commercial malicious software scan engines). If the scan does not flag the executable as having malicious software, then the executable is further analyzed by a staff member to research behaviors of the executable and further determine if malicious software is present in the executable.

If the research and analysis 420 determines that there is not malicious software in the executable, then the respective whitelist 12/14/512/514 is updated and the executable is allowed to run.

If the research and analysis 420 determines that there is malicious software in the executable, the computer 10 and/or user is notified. For example, the user is sent an email providing details of the malicious software and perhaps instructions on how to remove the malicious software as well as how to prevent the same thing from infecting their computer 10 in the future, etc. In some embodiments, the user is directed to a training course to help them learn how to prevent malicious software from getting into the computer 10.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for computer security, the system comprising:
   two whitelists, a first whitelist of the two whitelists for signed executables and a second whitelist of the two whitelists for unsigned executables;
   a server, the server having a server processor and storage containing the two whitelists;
   a computer protected by the system for computer security, the computer having a processor and memory, the processor is configured to:
      detect an attempt to run an executable,
      determine when the executable includes a digital signature stored within the executable, the digital signature having been issued by a certification authority;
      when the executable includes the digital signature, search the first whitelist for the executable and when the executable is present on the first whitelist, allow the executable to run;
      when the executable is without the digital signature, search the second whitelist for the executable and when the executable is present on the second whitelist, allow the executable to run;
      when the executable is not found in a respective whitelist of the two whitelists, forward the executable, a metadata of the executable, or all or a portion of the executable to the server;
   the server processor is configured to:
      further analyze the executable and when malicious software exists in the executable, send an email to a user of the computer to notify the user of the malicious software and block the executable;
      when no malicious software exists in the executable, update the respective whitelist of the two whitelists and send a transaction to the computer;
      responsive to the computer receiving the transaction, the processor is configured to allow the executable to run;
   when there may be the malicious software in the executable, the server processor is configured to queue the executable for further research and execution of the executable is blocked;
   wherein the further research includes the server processor being further configured to install the executable on a clean computer that is isolated, to run the executable on the clean computer, and to analyze a file system and registry of the clean computer to determine if the executable includes the malicious software; and
   wherein the email includes a link to training on how to prevent future intrusions of the malicious software into the computer.

2. The system of claim 1, wherein the email further comprises training regarding malware.

3. The system of claim 2, wherein the storage associated with the server is cloud storage.

4. The system of claim 1, wherein the further research includes human analysis of the executable.

5. The system of claim 1, wherein the further research includes the server processor being further configured to install the executable on the clean computer that is isolated and scanning the executable using a commercially available virus scanning software to determine if the executable includes the malicious software.

6. The system of claim 1, wherein the email includes a description of the malicious software.

7. A method of protecting a computer, the method comprising:
   providing two whitelists, a first whitelist of the two whitelists for signed executables and a second whitelist of the two whitelists for unsigned executables;
   providing a server, the server having a server processor and storage containing the two whitelists;
   providing a computer for being protected, the computer having a processor and memory;
   the processor is configured for detecting an attempt to run an executable and determining when the executable includes a digital signature stored within the executable, the digital signature having been issued by a certification authority;
   when the executable includes the digital signature, the processor searching the first whitelist for the executable and when the executable is present on the first whitelist, the processor allowing the executable to run;
   when the executable is without the digital signature, the processor searching the second whitelist for the executable and when the executable is present on the second whitelist, the processor allowing the executable to run;
   when the executable is not found in a respective whitelist of the two whitelists, the processor forwarding the executable, a metadata of the executable, or all or a portion of the executable to the server;
   the server processor is configured for further analyzing the executable and when malicious software exists in the executable, the server processor sending an email to a user of the computer to notify the user of the malicious software and the computer blocking the executable;
   when no malicious software exists in the executable, the server processor updating the respective whitelist of the two whitelists and sending a transaction to the computer;
   responsive to the computer receiving the transaction, the processor allowing the executable to run; and
   when there may be the malicious software in the executable, the server processor queuing the executable for further research and blocking execution of the executable;
   wherein the further research includes the server processor further installing the executable on a clean computer that is isolated, running the executable on the clean computer, and analyzing a file system and registry of the clean computer, determining if the executable includes the malicious software; and
   wherein the email includes a link to training on how to prevent future intrusions of the malicious software into the computer.

8. The method of claim 7, wherein the further research comprises scanning the executable using commercially available virus scanning software to determine if the executable includes the malicious software.

9. A computer program product comprising:
   a non-transitory storage medium of a computer having computer readable instructions stored therewith and two whitelists, a first whitelist of the two whitelists for signed executables and a second whitelist of the two whitelists for unsigned executables, the computer readable instructions being executable by a processor of a computer and comprising:

computer readable instructions running on the processor cause the processor to detect an attempt to run an executable, the computer readable instructions running on the processor cause the processor to determine when the executable includes a digital signature stored within the executable, the digital signature having been issued by a certification authority;

when the executable includes the digital signature, the computer readable instructions running on the processor search the first whitelist for the executable and when the executable is present on the first whitelist, allow the executable to run;

when the executable is without the digital signature, the computer readable instructions running on the processor search the second whitelist for the executable and when the executable is present on the second whitelist, allow the executable to run;

when the executable is not found in a respective whitelist of the two whitelists, the computer readable instructions running on the processor forwards the executable, a metadata of the executable, or all or a portion of the executable to a server computer;

a second non-transitory storage medium of the server computer having computer readable instructions stored therewith, the computer readable instructions being executable by a server processor of the server computer and comprising:

computer readable instructions running on the server processor analyze the executable and when malicious software exists in the executable, send an email to a user of the computer to notify the user of the malicious software and block the executable;

when no malicious software exists in the executable, the computer readable instructions running on the server processor update the respective whitelist of the two whitelists and send a transaction to the computer;

responsive to the computer receiving the transaction, the computer readable instructions running on the processor allow the executable to run; and when there may be the malicious software in the executable, the computer readable instructions running on the server processor queue the executable for further research and execution of the executable is blocked;

wherein the further research includes the computer readable instructions running on the server processor further install the executable on a clean computer that is isolated, then run the executable on the clean computer, and analyze a file system and registry of the clean computer to determine if the executable includes the malicious software; and wherein the email includes a link to training on how to prevent future intrusions of the malicious software into the computer.

10. The computer program product of claim 9, wherein the further research is performed by a human being.

11. The computer program product of claim 9, wherein the further research includes the computer readable instructions running on the server processor cause the server processor to install the executable on a clean computer that is isolated from a wide area network and to scan the executable with a commercially available malicious software scan system to determine when the executable includes malicious software and when the executable include the malicious software, the computer readable instructions running on the server processor cause the server processor to send the email to the user of the computer, the email including a description of the malicious software.

* * * * *